June 1, 1926.
W. O. MAITLAND
1,586,757
COMBINED SAFETY VALVE AND FUEL CONTROL
Filed May 5, 1924
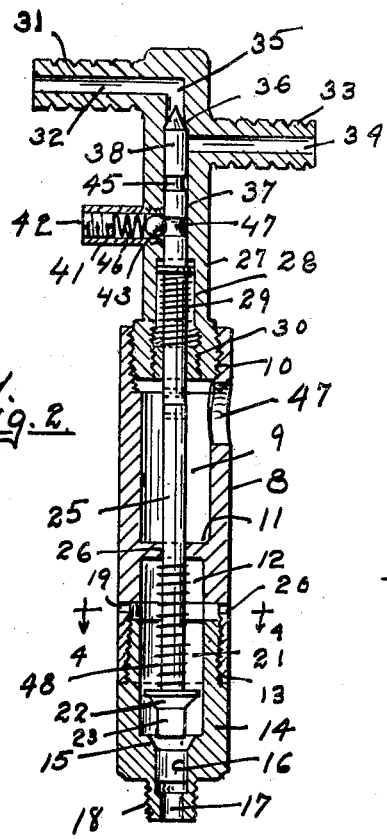
Fig. 2
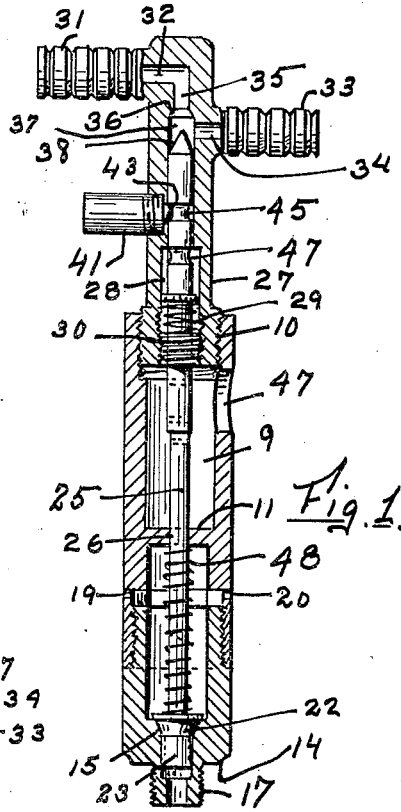
Fig. 1
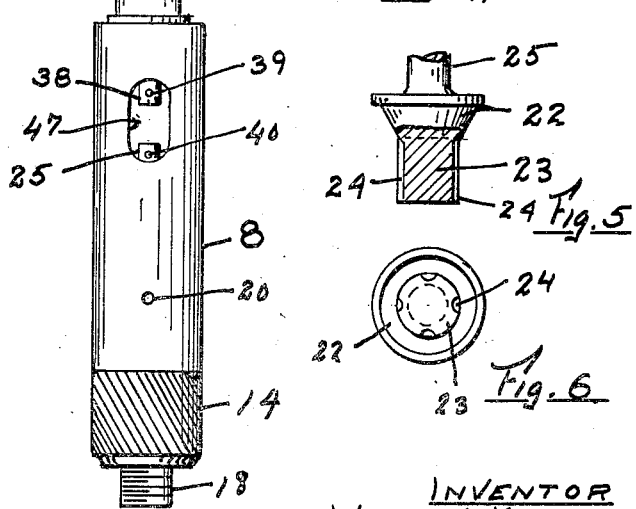
Fig. 3
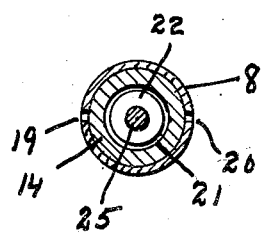
Fig. 4
Fig. 5
Fig. 6
INVENTOR
WALTER O. MAITLAND
by Frank Waterfield
ATTORNEY Patented June 1, 1926.

1,586,757

UNITED STATES PATENT OFFICE.

WALTER O. MAITLAND, OF FRESNO, CALIFORNIA.

COMBINED SAFETY VALVE AND FUEL CONTROL.

Application filed May 5, 1924. Serial No. 711,024.

My device relates primarily to means for controlling the steam pressure in a steam boiler, or the like, and consists essentially of means operated by the pressure within the boiler to cut off the fuel supply to the burners, thereby preventing the further generation of steam.

My present invention is designed primarily for use in steam vulcanizers such as are used in mechanical dental laboratories in vulcanizing dental plates, and the object thereof is to provide means whereby when the steam pressure within the vulcanizer has reached a certain limit the said pressure will automatically set in motion devices which will cut off the supply of fuel, thereby preventing any increase in pressure and the resultant damage to the vulcanizer.

Other objects and advantages will appear hereinafter and, while I have shown and will describe the preferred form of my invention, I wish it understood that I do not limit myself to such preferred form, but that various changes and adaptations may be made therein without departing from the spirit of my invention.

In the drawings accompanying and forming a part hereof:

Fig. 1 is a central longitudinal section of my device, partly in elevation, showing the same in its inoperative position.

Fig. 2 is a similar view to Fig. 1, showing my device in its operative position.

Fig. 3 is a left hand side elevation of my device after the device has operated and cut off a further supply of fuel.

Fig. 4 is a section on the line 4—4 of Fig. 2.

Fig. 5 is a fragmentary side elevation, partly in section, of the operating piston used with my device.

Fig. 6 is a bottom plan of Fig. 5.

Referring to the drawings, my device comprises an outer cylindrical casing or body 8 provided in one end with a cylindrical chamber 9 the outer end of which is screwthreaded at 10. Provided intermediate the length of body 8 is a partition 11, and immediately below this partition is provided a chamber 12 the lower end of which is enlarged as at 13 and interiorly screwthreaded. Secured to the lower end of body 8, in screwthreaded engagement with the threads 13, is a valve casing 14 in which is provided a valve seat 15. Extending downwardly from valve seat 15 is a cylindrical aperture 16 which is connected to an opening 17 in the lower reduced and exteriorly threaded portion 18 of member 14. This lower reduced and threaded portion provides means for connecting my device to the steam vulcanizer or other device with which it is to be used so that steam generated may enter through aperture 17 into aperture 16, as hereafter explained. Extending through the walls of body 8, at the lower termination of chamber 12, are opposed openings 19 and 20 which permit the escape of the steam, when the device is operated by excess pressure, to atmosphere. Provided within member 14, above valve seat 15, is a chamber 21 which coincides with chamber 12. Mounted within chamber 21 is a valve 22 adapted to normally rest upon seat 15 to prevent the passage of fluid therethrough. Extending downwardly from valve 22 is a nose 23 which is provided on its outer periphery with a plurality of kerfs 24, as best shown in Fig. 6, the object of these kerfs being to permit steam to pass upwardly into chamber 21 before valve 22 is withdrawn entirely from its seat. Extending upwardly from valve 22, centrally thereof, is a valve stem 25 which passes through an aperture 26 in partition 11 and terminates at a distance thereabove. Mounted at its lower end in the threaded portion 10 of body 8, in screwthreaded engagement, is a fuel valve control casing 27 in the lower end of which is provided an interior spring chamber 28 in which is mounted a coil spring 29. A plug 30, screwthreaded into the lower end of chamber 28, serves to hold spring 29 within said chamber. Extending outwardly from the upper end of casing 20 is an inlet tube 31 provided with an inlet aperture 32 therein, and extending outwardly from the opposite side of casing 27, and at a distance below tube 31, is an outlet tube 33 provided with an outlet opening 34, and connecting the inner ends of openings 32 and 34 is a passage 35 the lower end of which terminates in a valve seat 36 a short distance above outlet opening 34. Extending downwardly from valve seat 36 is a valve chamber 37 in which is slidably mounted a shut-off valve 38 the lower end of which extends downwardly through plug 30, and its lower end normally rests upon the upper end of valve stem 25. The lower end of valve 38 and the upper end of stem 25 are provided with apertures 39 and 40 for a purpose hereafter explained. Provided within member 27 is a tubular casing 41 the outer end of which is closed by a screw plug 42, and mounted in the inner end of casing 41 is a ball 43 adapted to be received in annular recesses 44 and 45 in the outer periphery of valve 38. A coil spring 46 is mounted within casing 41 between screw plug 42 and ball 43 and serves to hold ball 43 within one of the recessses 44 or 45. Provided in the side wall of body 8, adjacent to the adjacent ends of valve 38 and stem 25, is an opening 47. Coiled around stem 25, between partition 11 and valve 22, is a coil spring 48 which serves to normally hold valve 22 upon its seat.

In the operation of my device, when positioned for use the parts will normally lie in the positions shown in Fig. 1, with chamber 17 connected to the steam chamber of the vulcanizer, aperture 32 connected to a source of fuel supply, and aperture 34 connected to the burner. As the steam pressure rises in the steam chamber the pressure will be exerted against the lower end of nose 23, and, when sufficiently high to overcome the tension of spring 48, will force said nose upwardly, and with it valve 22 and stem 25, thereby forcing valve 38 upwardly into the position shown in Fig. 2, thus cutting off the supply of fuel to the burner, ball 43 passing into recess 44 to hold said valve in its closed position. The steam within chambers 12 and 21 will pass through apertures 19 and 20 to atmosphere. As the pressure is reduced spring 48 will act to return valve 22 to its normal closed position upon seat 15.

When it is again desired to light the burner a suitable tool will be provided which will be passed through aperture 47 into engagement with aperture 30 in the lower end of valve 38, when the same may be drawn downwardly into its open position and the fuel again permitted to flow through aperture 32, chamber 35 and aperture 34 to the burner. Aperture 40 is provided so that if desired valve 22 may be lifted to permit steam to escape to atmosphere if desired.

Having described my invention, what I claim is:

1. In a device of the character described the combination of a pressure valve chamber casing and a fuel control valve chamber casing, connected together at their ends in longitudinal alinement, said fuel control valve chamber having a valve seat intermediate its ends; a gas inlet opening into said fuel control valve chamber below said valve seat; a gas outlet opening into said valve chamber above said valve seat; a fuel control valve mounted in said fuel control valve chamber to move longitudinally and having a downwardly extending stem, said stem extending into said pressure valve chamber casing; a valve seat in the lower end of said pressure valve chamber; a valve for said last valve seat having an upwardly extending stem, said stem being of a length to abut at its upper end against the lower end of said fuel control valve stem when the same is in its open position and said pressure valve is in its closed position whereby upward movement of said pressure valve will move said fuel valve upwardly to control the passage of fuel through said fuel openings; means to yieldably secure said fuel valve in its open or closed positions; a spring coiled around said pressure valve stem between said valve and the upper end of said casing adapted to normally hold said valve seated; and a connection from said pressure valve chamber to atmosphere.

2. In a device of the character described the combination of a pressure valve chamber casing and a fuel control valve chamber casing connected together at their ends in longitudinal alinement, said fuel control valve chamber having a valve seat intermediate its ends; a fuel inlet opening into said fuel valve chamber below said valve seat; a fuel outlet from said valve chamber above said seat, said inlet and outlet openings being on opposite sides of said casing; a fuel control valve mounted in said fuel valve chamber to move longitudinally and having a downwardly extending stem said stem projecting for a distance into said pressure valve chamber casing; a partition in said pressure valve chamber intermediate the ends thereof extending horizontally; a connection from the lower end of said pressure valve chamber to a generator; a valve seat in said pressure valve chamber for controlling said connection; a valve for said seat having an upwardly extending stem said stem being of a length to abut against the lower end of the fuel control valve stem when said valves are in their open and closed positions respectively; a spring coiled around said pressure control valve stem between its valve and said partition adapted to normally hold said pressure valve closed; and a connection from said pressure control valve to atmosphere above said valve seat.

3. A combined safety valve and fuel control cut off for steam generators comprising a casing adapted to be connected at its lower end to said generator; an opening in the lower end of said casing adapted for the passage of steam, said opening terminating at its inner end in a valve seat; a valve for controlling said valve seat having a stem, said stem extending upwardly into said casing centrally thereof; fuel inlet and outlet openings in the upper end of said casing at opposite sides thereof; a passage connecting said inlet and outlet openings; a valve seat in said passage between said inlet and out openings; a valve slidably mounted in the upper end of said casing adapted to control said valve seat and prevent the passage of fuel therethrough; and having a downwardly extending stem adapted to engage the stem of said steam valve whereby opening of said steam valve will close said fuel control valve; means to return said steam valve to its normal closed position upon the reduction of pressure; means to yieldably lock said fuel valve in its extreme open or closed position; and means to return said fuel valve to its open position; and outlets in said casing for the passage of steam therefrom to atmosphere.

In witness that I claim the foregoing I have hereunto set my hand this 4th day of April, 1924.

WALTER O. MAITLAND.